United States Patent [19]

Kubota

[11] Patent Number: 4,487,381
[45] Date of Patent: Dec. 11, 1984

[54] WEBBING RETRACTOR
[75] Inventor: Tatsushi Kubota, Aichi, Japan
[73] Assignee: Kabushiki Kaisha Tokai-Rika-Denki Seisakusho, Aichi, Japan
[21] Appl. No.: 421,260
[22] Filed: Sep. 22, 1982

[30] Foreign Application Priority Data

Nov. 6, 1981 [JP] Japan .................................. 56-178684
Nov. 6, 1981 [JP] Japan .................................. 56-178685

[51] Int. Cl.³ ........................ A62B 35/00; B65H 75/48
[52] U.S. Cl. ........................... 242/107; 242/107.4 R
[58] Field of Search ................. 242/107, 107.4 R; 280/806, 807; 297/475–478; 200/61.58 B

[56] References Cited

U.S. PATENT DOCUMENTS

| | | | |
|---|---|---|---|
| 3,830,444 | 8/1974 | Sargeant | 200/61.58 B X |
| 3,853,284 | 12/1974 | Hasegawa et al. | 200/61.58 B X |
| 4,002,219 | 1/1977 | Steinmann | 242/107 |
| 4,125,231 | 11/1978 | Henderson | 242/107 |
| 4,402,472 | 9/1983 | Burtscher | 242/107 |

FOREIGN PATENT DOCUMENTS 2742676  4/1979  Fed. Rep. of Germany ... 242/107.4 R

*Primary Examiner*—John M. Jillions
*Attorney, Agent, or Firm*—Koda and Androlia

[57] ABSTRACT

A resilient member for biasing a webbing takeup shaft in a direction of retracting a webbing, after the webbing is fastened about an occupant, is driven in a direction of reducing the biasing force by a returning device, whereby the winding force acting on the webbing is reduced, so that an oppressive feeling rendered to the occupant can be reduced. After the webbing has been unfastened from the occupant, the returning device drives the resilient member in a direction of increasing the biasing force to retract the webbing to a fully retracted state.

20 Claims, 14 Drawing Figures

WEBBING RETRACTOR

BACKGROUND OF THE INVENTION

1. Field of the Invention

This invention relates to a webbing retractor used in a seatbelt system for protecting an occupant in an emergency of a vehicle, and more particularly to a webbing retractor intended for decreasing a retracting force after a webbing has been fastened about the occupant.

2. Description of the Prior Art

A webbing retractor is adapted to wind onto a takeup shaft one end of an occupant restraining webbing by a biasing force of a resilient member. This biasing force of the resilient member makes it possible to closely fastened the webbing about the occupant and wind the webbing into the retractor after the occupant has released the webbing from himself, so that the webbing may be prevented from lying about in disorder in a compartment.

However, this biasing force of the resilient member is turned into a webbing tension to give the occupant an oppressive feeling, thereby presenting the disadvantage that the oppressive feeling causes fatigue to the occupant, and further, leads to a reduced rate of fastening the webbing.

From the above-described reason, there has heretofore been proposed a webbing retractor, in which the tension of the webbing is automatically decreased after the webbing has been fastened about the occupant. In the webbing retractor of the type described, a pair of resilient members are arranged in series, connecting portions of the pair of resilient members are fixed after the webbing is fastened about the occupant, and only the biasing force of one of the resilient members is applied to the webbing, thus resulting in complicated construction.

SUMMARY OF THE INVENTION

The present invention has been developed in view of the above-described disadvantages and has as its object the provision of a webbing retractor capable of reliably obtaining a desirable decreased state of the webbing tension in spite of using a single resilient member.

In the webbing retractor according to the present invention, after the webbing has been fastened about the occupant, a control system causes a returning device to move the resilient member by a predetermined value in a direction of loosening the webbing as as to reduce the oppressive feeling acting on the occupant, while, after the webbing has been released from the occupant, the returning device moves the resilient member by the value equal to the aforesaid predetermined value in a direction of increasing the biasing force so as to wind the webbing.

Description will hereunder be given of an embodiment of the present invention with reference to the drawings.

DESCRIPTION OF THE PREFERRED EMBODIMENTS

Figure 1:
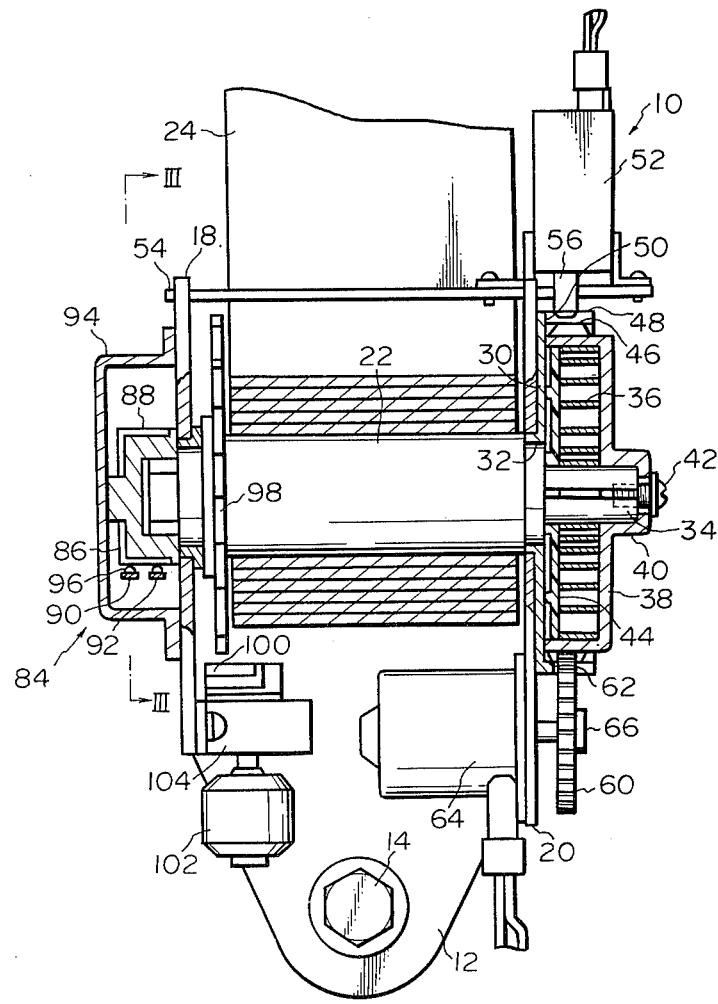
FIG. 1 is a sectional view showing an embodiment of the webbing retractor according to the present invention.
Figure 2:
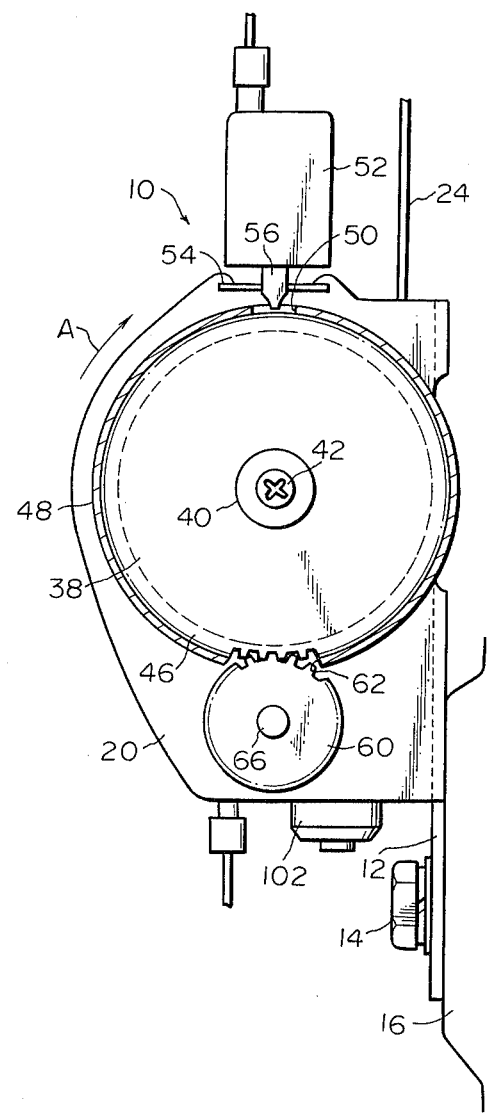
FIG. 2 is a right side view of FIG. 1.
Figure 3:
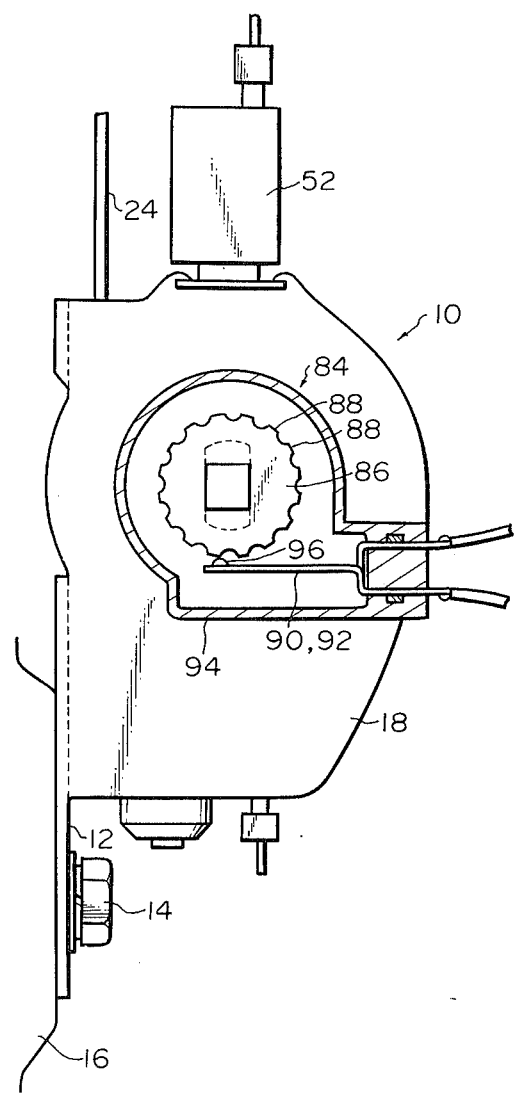
FIG. 3 is a left side view of FIG. 1.

A webbing retractor 10 shown in FIGS. 1 through 3 is solidly secured at a frame 12 thereof to a vehicle body 16 through a mounting bolt 14.

Figure 4:
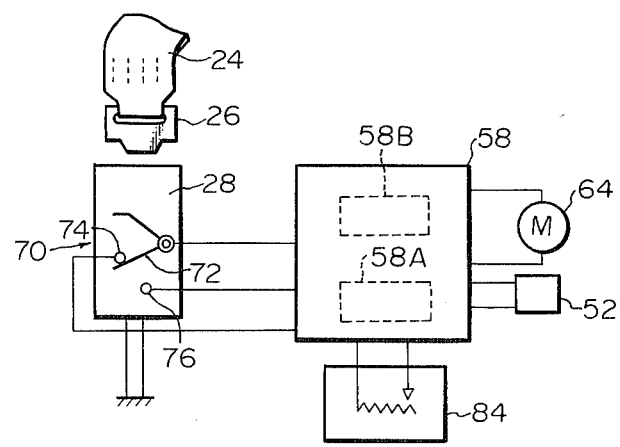
FIG. 4 is a wiring diagram showing connections of a microcomputer.
Figure 5:
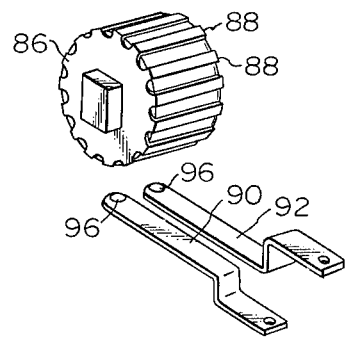
FIG. 5 is a disassembled perspective view showing a rotation detector.

A pair of leg plates 18 and 20 extend from opposite side portions of the frame 12 in parallel to each other, and opposite end portions of a takeup shaft 22 are journalled on the pair of leg plates 18 and 20. One end of an occupant restraining webbing 24 is secured to this takeup shaft 22, and the other end of the webbing 24 is secured thereto with a tongue plate 26 shown in FIG. 4. The occupant engages this tongue plate 26 with a buckle device 28 mounted to the vehicle body, so that the intermediate portion of the webbing 24 can be fastened about himself. In FIG. 4, construction of engagement of the tongue plate 26 with the buckle device 28 is not shown.

The takeup shaft 22 is journalled on the leg plate 20 through a cylindrical portion 32 projecting from an inner end of a base 30 solidly secured to an outer surface of the leg plate 20, and an inner end of a spiral spring 36 is engaged with a small-diameter portion 34 connected to an end portion of the takeup shaft 22. This spiral spring 36 is incorporated in a spring case 38 and an outer end thereof is engaged with the inner periphery of the spring case 38.

A small-diameter portion 40 of the spring case 38 is loosely coupled onto the small-diameter portion of the takeup shaft 22 and adapted to be rotated about the small-diameter portion 34 of the takeup shaft. The small-diameter portion 40 is prevented from moving in the axial direction thereof by a screw 42 threadably coupled to the small-diameter portion 34 of the takeup shaft. A sheet 44 is interposed between the spiral spring 36 and the base 30 to reduce a frictional resistance generated between the spiral spring 36 and the base 30.

The spring case 38 is provided on the outer periphery thereof with a gear wheel 46 disposed close to the inner peripheral surface of a cover 48 erected from the periphery of the base 30.

Part of the gear wheel 46 is opposed to a solenoid 52 through a cutout 50 formed in the cover 48. This solenoid 52 is secured to a support bar 54 solidly secured to the leg plates 18 and 20, and a pin 56 of the solenoid 52 passes through the cutout 50 and can contact or recede from the gear wheel 46.

The pin 56 is normally meshed with the gear wheel 46 by a biasing force of a resilient member incorporated in the solenoid 52 so as to perform a braking function for stopping rotation of the gear wheel 46. The solenoid 52 is connected to a microcomputer 58 as a control system shown in FIG. 4 and operated by this microcomputer 58 to separate the pin 56 from the gear wheel 46 so that the spring case 38 can be rotated.

In consequence, the spring case 38 supports a reaction force against the biasing force of the spiral spring 36, when the pin 56 is meshed with the gear wheel 46, so as to apply a force in a direction of retracting the webbing (direction indicated by an arrow A in FIG. 2) to takeup shaft 22.

Outwardly of the leg plate 20, there is disposed a pinion 60 on the opposite side to the solenoid 52 with respect to the takeup shaft 22. This pinion 60 is meshed with the gear wheel 46 through a cut-away portion 62. Furthermore, this pinion 60 is solidly secured to an output shaft 66 of a motor 64 as being the returning device that is affixed to the leg plate 20, to thereby receive a turning force of the motor 64.

After the webbing has been fastened to the occupant, the motor 64 is energized in response to a signal from the microcomputer 58. The webbing-fastened condition of the occupant is adapted to be detected by the connection of a buckle switch 70, which is provided in the buckle device 28, to the microcomputer 58. More specifically, when the tongue plate 26 is in a withdrawn state, i.e., the webbing is not fastened about the occupant, a movable contact 72 of the buckle switch 70 is connected to a stationary contact 74, whereas, when the webbing is fastened about the occupant, i.e., the tongue plate 26 is engaged with the buckle device 28, the movable contact 72 is brought into contact with a stationary contact 76, whereby the webbing unfastened or fastened condition of the occupant is reported to the microcomputer 58, as the case may be.

The microcomputer 58 is connected to a rotation detector 84 solidly secured to the outer surface of the leg plate 18, and this rotation detector 84 is adapted to detect the rotated position of the takeup shaft when the webbing is unfastened from the occupant and the rotated position of the takeup shaft when the webbing is fastened about the occupant, as referenced from the rotated position of the takeup shaft when the webbing is fully wound up.

More specifically, the rotation detector 84 has its rotary contact 86 secured to the takeup shaft 22, and a plurality of small pieces 88 being conductive with one another are provided on the periphery of this rotary contact 86 in parallel to the axis of the takeup shaft. These small pieces 88 are arranged at regular intervals on one and the same radius centered about the axis of the takeup shaft and opposed to contacts 90 and 92. These contacts 90 and 92 have their base portions supported by a rotor cover 94 and are connected to the microcomputer 58. When projections 96 and 96 of the contact 90 and 92 are brought into contact with one of the small pieces 88, a signal indicating a conductive condition is fed to the microcomputer 58. When the projections 96 and 96 are disposed between the small pieces 88, a signal indicating a shut-off condition is fed to the microcomputer 58. A Central Processing Unit (CPU) 58B in the microcomputer 58 adds this conductive or shut-off condition to the number of revolutions of the takeup shaft, which is to be stored in a memory 58A.

When fed with the signal indicating that the webbing is fastened about the occupant from the buckle switch 70, the memory 58A and the Central Processing Unit 58B in the microcomputer 58 feed to the motor 64 a signal for turning the spring case 38 in a direction of loosening the spring at a predetermined rate to the number of revolutions of the takeup shaft from fully retracted state thereof to the webbing-fastened condition. This rate may be made to be a predetermined rate to the number of revolutions of the takeup shaft from the fully retracted state thereof to the webbing-fastened condition, or the number of revolutions of the takeup shaft in the direction of loosening the spring in proportion to the number of revolutions of the takeup shaft may be increased, so that, after the loosening of the spring, the retracting force acting on the webbing can be made a predetermined one at all times no matter what the physical build of the occupant is.

The microcomputer 58 operates the solenoid 52 to stop rotation of the spring case 38 after the spring case 38 has rotated in the direction of loosening the spring. Hence, if the occupant changes his driving posture to withdraw the webbing while sitting in a vehicle, the retracting force increases accordingly. However, if the occupant returns to the original driving posture, then the decreased condition of the retracting force is restored. In this case, there is a possibility that the webbing thus withdrawn is not reliably retracted and, after the occupant has returned to the original driving posture, the webbing has a sag to thereby form a gap between the occupant and the webbing. Hence, the microcomputer 58 can emit a signal for temporarily rotating the spring case 38 in a direction of increasing the biasing force through the detection of the webbing unwinding rotation by the rotation detector 84.

As shown in FIG. 1, a ratchet wheel 98 is solidly secured to the takeup shaft 22 and opposed to a pawl 100 journalled on the leg plate 18. This pawl 100 is mounted on a pendulum 102, and adapted to be meshed with the ratchet wheel 98 to stop the webbing unwinding rotation of the takeup shaft 22 when the pendulum 102 is tilted in an emergency situation of the vehicle. The pendulum 102 is mounted on a bracket 104 projecting from the leg plate 18.

Description will hereunder be given of action of the present embodiment with the above-described arrangement. When the occupant withdraws the webbing 24 from the retractor 10 by a stroke $S_1$ and engages the tongue plate 26 with the buckle device 28 upon entering the vehicle, the webbing 24 is fastened about the occupant. At this time, the retracting force is indicated by $F_1$ in FIG. 6, and the value of the webbing withdrawn from the withdrawal stroke $S_0$ in the fully retracted state is indicated by D.

Figure 6:
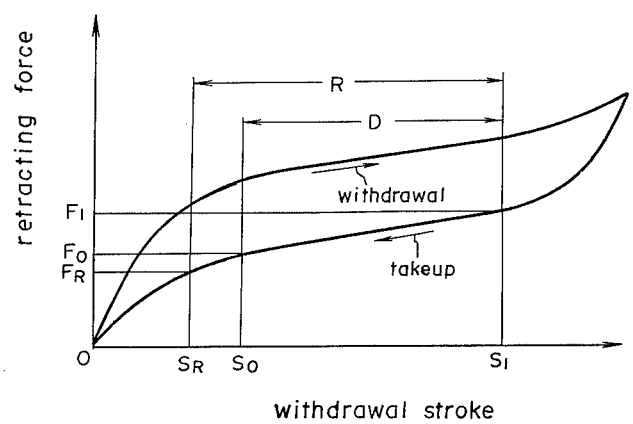
FIG. 6 is a diagram showing the relations between a withdrawal stroke and a webbing retracting force.
Figure 7:
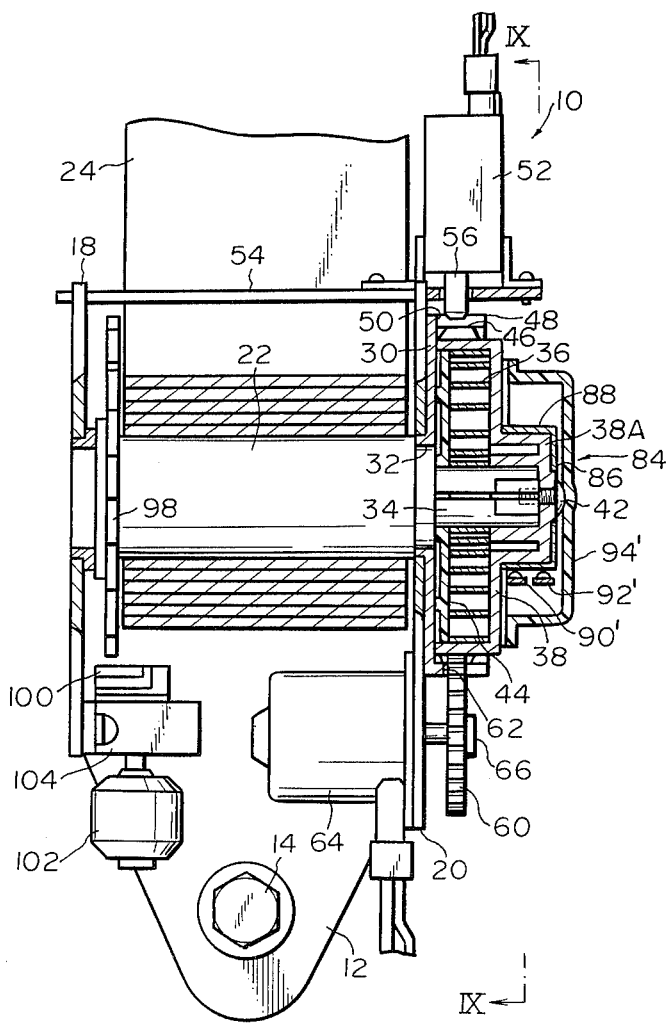
FIG. 7 is a sectional view showing the webbing retractor in a second embodiment of the present invention.

Upon receiving a signal from the buckle switch 70 in the buckle device 28, the microcomputer 58 actuates the solenoid 52 to retract the pin 56, and at the same time, drives the motor 64 to rotate the spring case 38 in the direction of loosening the webbing by a predetermined value, whereby the retracting force becomes $F_R$, so that the oppressive feeling rendered to the occupant can be decreased as shown in FIG. 6.

As aforesaid, this stroke R may be made to be a predetermined rate to the value D of the withdrawn webbing, may be increased with the increase of the value D of the withdrawn webbing, or the retracting force after the loosening of the webbing may be set at a constant value (for example, $F_R$).

When the vehicle is in an emergency situation such as a collision, the pendulum 102 brings the pawl 100 into mesh with the ratchet wheel 98, whereby the takeup shaft 22 is prevented from rotating in the webbing unwindng direction, so that the occupant can be reliably restrained by the webbing 24, thereby enabling to secure the occupant in safety.

When the occupant withdraws the tongue plate 26 from the buckle device 28 to release the webbing 24 fastened about him, the microcomputer 58 actuates the solenoid 52 to separate the pin 56 from the gear wheel 46, to thereby make the spring case 38 rotatable. Simultaneously with this, the microcomputer 58 feeds a signal to the motor 64 to rotate the spring case 38 in a direction of increasing the biasing force by a value equal to the value of loosening the spring case that is stored in the microcomputer, whereby the webbing is retracted to the fully retracted state to make the retracting force to be $F_0$.

In order to quickly wind the webbing after the occupant has released the webbing fastened about him, the microcomputer 58 may feed a signal for temporarily making the retracting force of the takeup shaft 22 more than the retracting force $F_0$ in the fully retracted state.

FIGS. 7 through 10 show the second embodiment of the present invention. Differing from the preceding first embodiment, in this embodiment, the rotation detector 84 is provided on the outer surface of the leg plate 20. As apparent from FIG. 9, the rotor cover 94' is threadably secured to the leg plate 20, and the contact 90' and 92' secured to this rotor cover 94' are opposed to the rotary contact 86 solidly secured to the small-diameter portion 38A of the spring case 38, whereby the number of revolutions of the takeup shaft 22 is stored in the memory 58A in the same manner as in the preceding embodiment.

Figure 10:
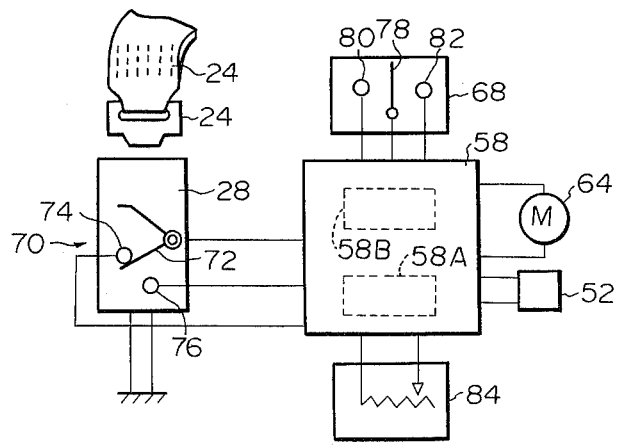
FIG. 10 is a wiring diagram showing the connection of the microcomputer for use in the second embodiment.
Figure 11:
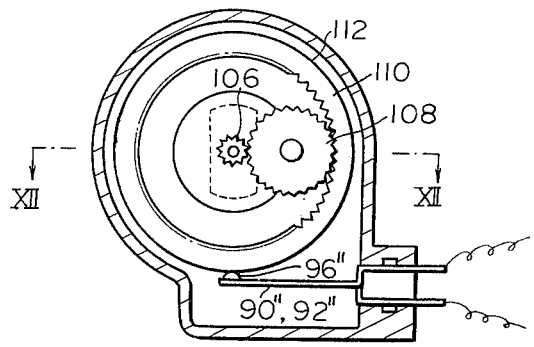
FIG. 11 is a sectional view showing the rotation detector in a third embodiment of the present invention.
Figure 12:
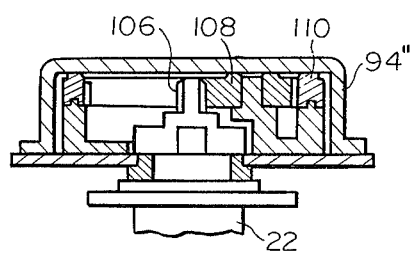
FIG. 12 is a sectional view taken along the line XII—XII in FIG. 11.

Furthermore, in the present embodiment, as shown in FIG. 10, an adjusting device 68 is connected to the microcomputer 58. This adjusting device 68 is provided therein with a control lever 78 and contacts 80 and 82, with which this lever is selectively brought into contact, with the contact 80 being the contact for loosening the webbing and the contact 82 being the contact for increasing the biasing force.

Figure 8:
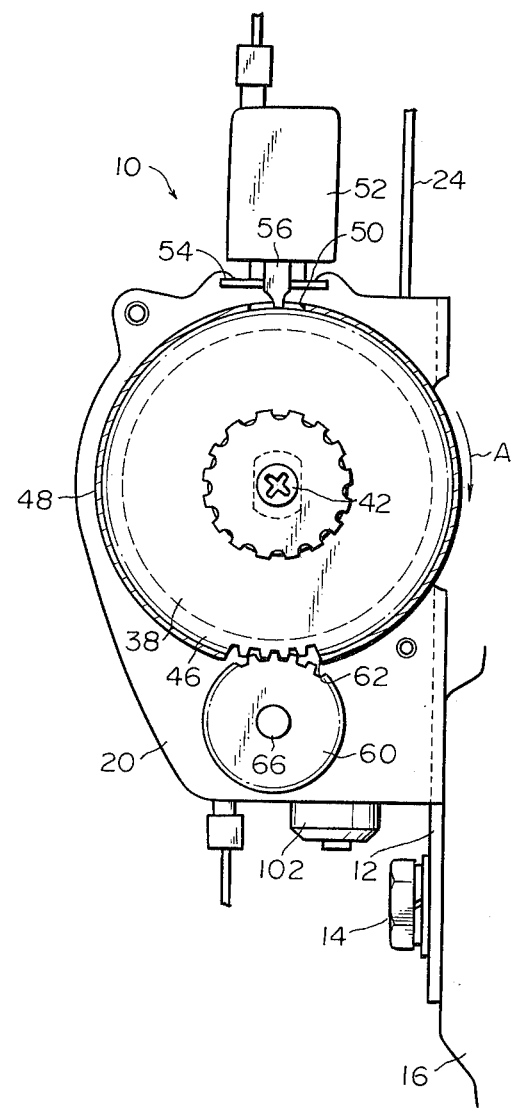
FIG. 8 is a right side view with a rotor cover shown in FIG. 7 being removed.
Figure 9:
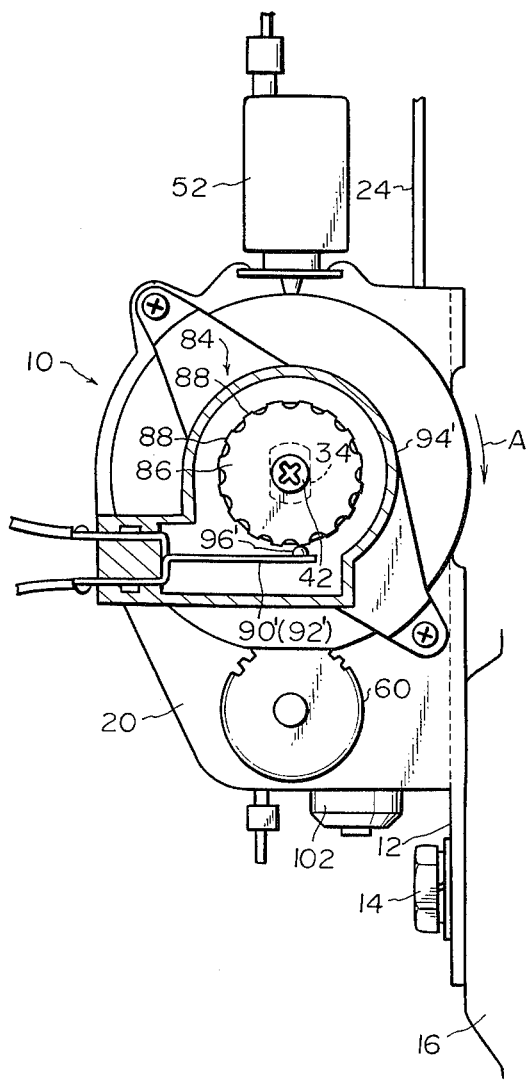
FIG. 9 is a sectional view taken along the line IX—IX in FIG. 7.

In consequence, when the occupant manually operates the control lever 78 to bring it into contact with the contact 80 upon fastening the webbing about himself, the microcomputer 58 drives the motor 64 to rotate the spring case 38 in the direction of loosening the spring 36 (a direction opposite to the direction indicated by an arrow A in FIG. 8) by a desired value, so that the webbing tension acting on the occupant as the oppressive feeling can be reduced. On the contrary, when the occupant brings the control lever 78 into contact with the contact 82, the spring case 38 is rotated in a direction opposite to the above, whereby the retracting force is increased.

In addition, in fastening the webbing about the occupant, if the control lever 78 is brought into contact with either the contact 80 or 82, the microcomputer 58 actuates the solenoid 52 to separate the pin 56 from the gear wheel 46 to make the spring case 38 rotatable. The respects in the arrangement other than the above are similar to those shown in the preceding embodiment.

For this, in this second embodiment also, the rotated position of the spring case 38 when the webbing is fastened about the occupant is stored in the memory 58A as being the reference position.

Here, to reduce the webbing winding force, when the occupant brings the control lever 78 into contact with the contact 80 by manual operation, the microcomputer 58 emits a command, in response to which the solenoid 52 separates the pin 56 from the gear wheel 46 to make the spring case 38 rotatable. Simultaneously with this, the motor 64 rotates the spring case 38 in the direction of winding the webbing, whereby the biasing force of the spiral spring 36 is reduced. In order to increase the webbing retracting force, the control lever 78 should be brought into contact with the contact 82.

Operation after the occupant has released the webbing fastened about himself is similar to that in the preceding embodiment, and the takeup shaft may be restored to the fully retracted state as seen before the webbing is fastened about the occupant.

FIGS. 11 through 14 show the third embodiment of the present invention as being another embodiment of the rotation detector.

In the present embodiment, a pinion 106 is solidly secured to the takeup shaft 22, and meshed with a reduction gear 108 journalled on the leg plate. The reduction gear 108 is meshed with an internal gear wheel 110 at the opposite side to the pinion 106, and this internal gear wheel 110 is coaxially, pivotally supported by the takeup shaft 22. In consequence, rotation of the takeup shaft 22 is imparted to the internal gear wheel 110 after reduction in speed has been made.

Figure 13:
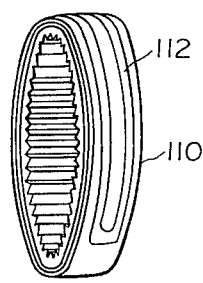
FIG. 13 is a perspective view showing an internal gear wheel shown in FIG. 11.
Figure 14:
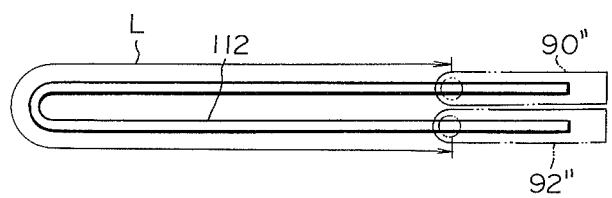
FIG. 14 is an exploded view showing a U-shaped rotary contact.

Stuck on the outer periphery of the internal gear wheel 110 is a U-shaped rotary contact 112 shown in FIGS. 13 and 14. This U-shaped rotary contact 112 is an electrically conductive thin film such for example as a carbon sheet.

This U-shaped rotary contact 112 is in contact with the projections 96'' of the contacts 90' and 92', whereby the rotary contact 112 interconnects the contacts 90' and 92'. However, a length L of the rotary contact 112 interconnecting the contacts 90' and 92' varies due to the rotation of the takeup shaft, whereby the number of revolutions of the takeup shaft 22 is detected and stored in the memory of the microcomputer.

In this embodiment, the direction of change in the resistance value is varied depending on the winding rotation or unwinding rotation of the takeup shaft, so that the direction of rotation of the takeup shaft can be readily detected.

Detectors of various types for detecting the number of revolutions of the takeup shaft are applicable in addition to those shown in the above-described embodiments. Furthermore, the present invention need not be limited to construction of detecting the number of revolutions of the takeup shaft, but the rotated position of the takeup shaft can be detected through detecting the webbing tension.

In the above-described first and second embodiments, the solenoid is used for stopping the rotation of the spring case under a normal condition, however, only if the motor 64 has a braking force sufficient for preventing the spring case from rotating when the motor 64 is not in operation, the solenoid need not necessarily be used.

What is claimed is:

1. A webbing retractor for housing an occupant restraining webbing used in a seatbelt system for protecting an occupant in an emergency situation of a vehicle, comprising:

(a) a takeup shaft secured thereto with one end of said occupant restraining webbing;

(b) a resilient member for biasing said takeup shaft in a direction of winding said webbing;

(c) a returning device for moving said resilient member in directions as to decrease and increase a biasing force of the resilient member;

(d) rotation detecting means for detecting rotated positions of the takeup shaft, and comprising a rotary contact member disposed at one end portion of the takeup shaft rotatable in accordance with a rotation of the takeup shaft and provided on its outer periphery with conductive material and a fixed contact member opposed to and contacting with the outer periphery of the rotary contact member; and (e) a control device for controlling said returning device to move said resilient member in a direction to decrease the biasing force thereof after the webbing has been fastened to the occupant whereby a retracting force acting upon said webbing is reduced, and for controlling said returning device to move said resilient member in a direction to increase the biasing force thereof when the webbing is unfastened from the occupant, whereby the retracting force is increased so that said webbing is retracted on to the takeup shaft up to a fully retracted state.

2. A webbing retractor as set forth in claim 1, wherein said rotary contact member is fixed to the takeup shaft and said conductive material comprises a plurality of conductive pieces arranged on the outer periphery of the rotary contact member at a predetermined interval.

3. A webbing retractor as set forth in claim 2, wherein said resilient member is a spiral spring connected at one end thereof to said takeup shaft and at the other end thereof to said returning device.

4. A webbing retractor as set forth in claim 2, wherein said returning device comprises a motor.

5. A webbing retractor as set forth in claim 3, wherein said spiral spring is incorporated in a spring case, which is rotated by said returning device.

6. A webbing retractor as set forth in claim 5, wherein said spring case is prevented from rotating by a brake means when said spring case is not subjected to the turning force of said returning device.

7. A webbing retractor as set forth in claim 1, wherein said rotary contact member is rotated in accordance with rotation of the takeup shaft through reduction gearing, and said conductive material comprises a U-shaped conductive film attached on the outer periphery of the rotary contact member therealong, whereby the direction of rotation of the takeup shaft is detected.

8. A webbing retractor as set forth in claim 3, said resilient member is a spiral spring connected at one end thereof to said takeup shaft and at the other end thereof to said returning device.

9. A webbing retractor as set forth in claim 3, wherein said returning device comprises a motor.

10. A webbing retractor as set forth in claim 8, wherein said spiral spring is incorporated in a spring case, which is rotated by said returning device.

11. A webbing retractor as set forth in claim 10, wherein said spring case is prevented from rotating by a brake means when said spring case is not subjected to the turning force of said returning device.

12. A webbing retractor used in a seatbelt system for restraining an occupant in an emergency situation of a vehicle such as a collision, comprising:

(a) a frame secured to a vehicle body;

(b) a takeup shaft journalled on said frame and secured thereto with one end of an occupant restraining webbing;

(c) a spiral spring engaged at one end thereof with the takeup shaft;

(d) a spring case incorporating said spiral spring and made rotatable relative to said takeup shaft;

(e) a drive means capable of rotating said spring case;

(f) rotation detecting means for detecting rotated positions of the takeup shaft, and comprising a rotary contact member disposed at one end portion of the takeup shaft rotatable in accordance with a rotation of the takeup shaft and provided on its outer periphery with conductive material and a fixed contact member opposed to and contacting with the outer periphery of the rotary contact member; and (g) a control device for controlling said returning device to move said resilient member in a direction to decrease the biasing force thereof after the webbing has been fastened to the occupant, whereby a retracting force acting upon said webbing is reduced, and for controlling said returning device to move said resilient member in a direction to increase the biasing force thereof when the webbing is unfastened from the occupant, whereby the retracting force is increased so that said webbing is retracted on the takeup shaft up to a fully retracted state.

13. A webbing retractor as set forth in claim 12, wherein said rotary contact member is fixed to the takeup shaft, and said conductive member comprises a plurality of conductive pieces arranged on the outer periphery of the rotary contact member at a predetermined interval.

14. A webbing retractor as set forth in claim 13, further comprising a brake for stopping said spring case during the period of time that said drive means is out of operation.

15. A webbing retractor as set forth in claim 14, wherein said control device is a microcomputer which can emit a signal to said drive means for controlling it.

16. A webbing retractor as set forth in claim 12, wherein said rotary contact member is rotated in accordance with rotation of the takeup shaft through reduction gearing, and said conductive material comprises a U-shaped conductive film attached on the outer periphery of the rotary contact member therealong, whereby the direction of rotation of the takeup shaft is detected.

17. A webbing retractor as set forth in claim 16, further comprising a brake for stopping said spring case during the period of time that said drive means is out of operation.

18. A webbing retractor as set forth in claim 17, wherein said control device is a microcomputer which can emit a signal to said drive means for controlling it.

19. A webbing retractor for housing an occupant restraining webbing used in a seatbelt system for protecting an occupant in an emergency situation of a vehicle, comprising:

(a) a takeup shaft secured thereto with one end of said occupant restraining webbing;

(b) a resilient member for biasing said takeup shaft in a direction of winding said webbing;

(c) a returning device for moving said resilient member in directions as to decrease and increase a biasing force of a resilient member;
(d) rotation detecting means for detecting rotated positions of the takeup shaft, and comprising a rotary contact member fixed to one end portion of the takeup shaft and a fixed contact member opposed to and contacting with an outer periphery of the rotary contact member, a plurality of conductive pieces being arranged on the outer periphery of the rotary contact member at a predetermined interval; and
(e) a control device for controlling said returning device to move said resilient member in a direction to decrease the biasing force thereof after the webbing has been fastened to the occupant, whereby a retracting force acting upon said webbing is reduced, and for controlling said returning device to move said resilient member in a direction to increase the biasing force thereof when the webbing is unfastened from the occupant, whereby the retracting force is increased so that said webbing is retracted on to the takeup shaft to a fully retracted state.

20. A webbing retractor for housing an occupant restraining webbing used in a seatbelt system for protecting an occupant in an emergency situation of a vehicle, comprising:

(a) a takeup shaft secured thereto with one end of said occupant restraining webbing;
(b) a resilient member for biasing said takeup shaft in a direction of winding said webbing;
(c) a returning device for moving said resilient member in directions as to decrease and increase a biasing force of the resilient member;
(d) rotation detecting means for detecting rotated positions of the takeup shaft, and comprising a rotary contact member rotated in accordance with rotation of the takeup shaft through reduction gearing and a fixed contact member opposed to and contacting with an outer periphery of the rotary contact member, a U-shaped conductive film being attached on the outer periphery of the rotary contact member therealong; and
(e) a control device for controlling said returning device to move said resilient member in a direction to decrease the biasing force thereof after the webbing has been fastened to the occupant, whereby a retracting force acting upon said webbing is reduced, and for controlling said returning device to move said resilient member in a direction to increase the biasing force thereof when the webbing is unfastened from the occupant, whereby the retracting force is increased so that said webbing is retracted on to the takeup shaft up to a fully retracted state.

* * * * *